Figure 1:
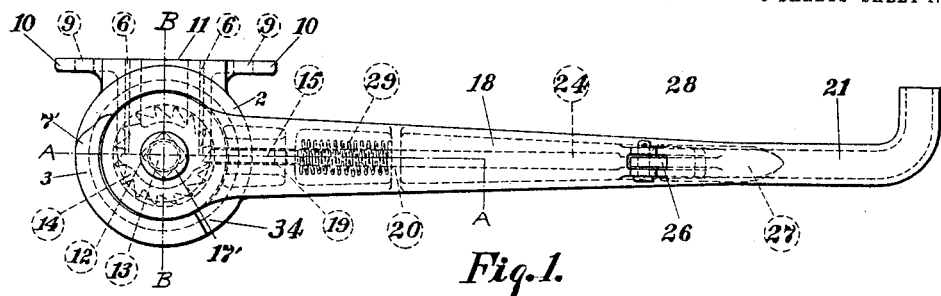

C. A. LINDSTRÖM.
BRAKE ACTUATING MECHANISM.
APPLICATION FILED JUNE 19, 1911.

1,120,395.

Patented Dec. 8, 1914.
5 SHEETS—SHEET 1.

Witnesses
Frank E. Miller
Lela M. Grunder

Inventor
Chas. Lindström

C. A. LINDSTRÖM.
BRAKE ACTUATING MECHANISM.
APPLICATION FILED JUNE 19, 1911.
1,120,395.
Patented Dec. 8, 1914.
5 SHEETS—SHEET 2.
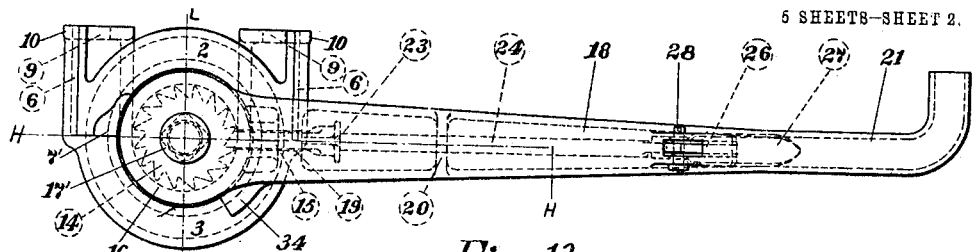
Fig. 13.
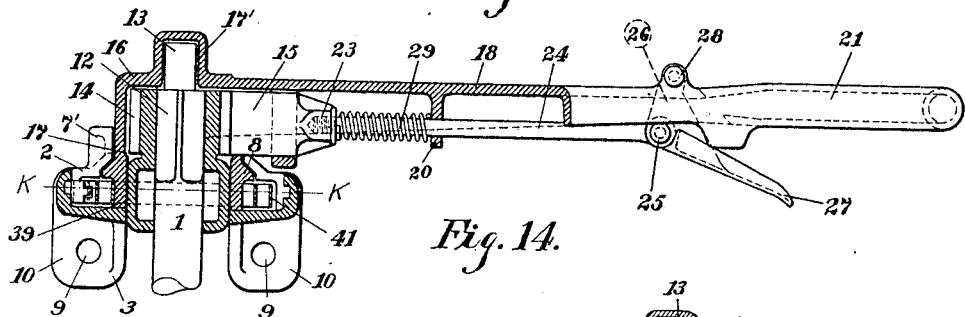
Fig. 14.
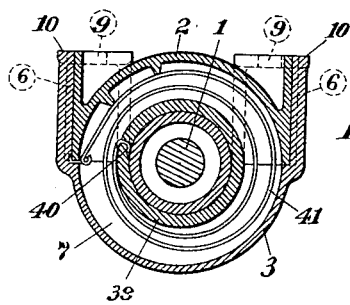
Fig. 15.
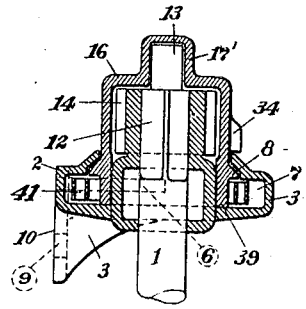
Fig. 16.
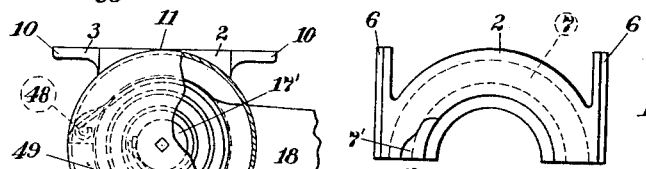
Fig. 17.
Fig. 18.
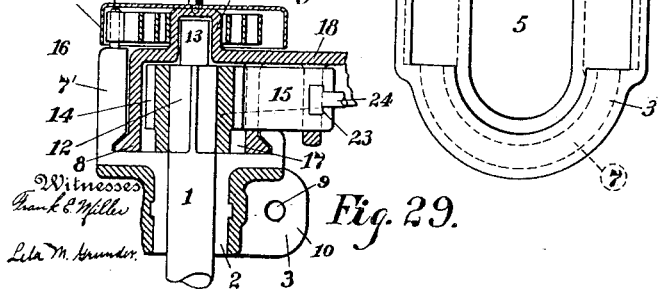
Fig. 28.
Fig. 29.
Witnesses
Frank E. Miller
Lila M. Arunder
Inventor
Charles Lindström

C. A. LINDSTRÖM.
BRAKE ACTUATING MECHANISM.
APPLICATION FILED JUNE 19, 1911.

1,120,395.

Patented Dec. 8, 1914.
5 SHEETS—SHEET 3.

Witnesses
Frank E. Miller
Lila M. Grunder

Inventor
Charles Lindström

C. A. LINDSTRÖM.
BRAKE ACTUATING MECHANISM.
APPLICATION FILED JUNE 19, 1911.

1,120,395.

Patented Dec. 8, 1914.
5 SHEETS—SHEET 4.

C. A. LINDSTRÖM.
BRAKE ACTUATING MECHANISM.
APPLICATION FILED JUNE 19, 1911.

1,120,395.

Patented Dec. 8, 1914.
5 SHEETS—SHEET 5.

Witnesses
Frank E. Miller.
Lela M. Grunder.

Inventor
Charles A. Lindström

UNITED STATES PATENT OFFICE.

CHARLES A. LINDSTRÖM, OF PITTSBURGH, PENNSYLVANIA, ASSIGNOR TO RATCHET BRAKE COMPANY, OF NEW YORK, N. Y., A CORPORATION OF DELAWARE.

BRAKE-ACTUATING MECHANISM.

1,120,395.  Specification of Letters Patent.  Patented Dec. 8, 1914.

Application filed June 19, 1911. Serial No. 634,023.

*To all whom it may concern:*

Be it known that I, CHARLES A. LINDSTRÖM, a citizen of the United States, residing at No. 138 Stratford avenue, Pittsburgh, in the county of Allegheny and State of Pennsylvania, have invented certain new and useful Improvements in Brake-Actuating Mechanism, of which the following is a specification, reference being had to the accompanying drawings, which form a part of the specification.

My invention relates to improvements in brake actuating mechanism and particularly to such mechanism as is actuated by a hand brake-lever as described and claimed in my United States Patents No. 574,549, granted January 5th, 1897, and No. 578,573, granted March 9th, 1897.

The objects attained by my present invention are as follows: 1, the assembling of the principal component parts without the use of bolts, rivets, keys or threaded parts; 2, the prevention of theft or malicious removal of the hand brake-lever; 3, the simplification of the mechanism, reduction of number and cost of parts and consequent cheapening of cost of manufacture, application and maintenance; 4, the fastening of the lower ratchet wheel to the shaft by suitably shaped portions obtained by making the mast in two parts; 5, the employment of means for automatically returning the hand brake-lever to its inoperative position; 6, the location of the automatic returning means in a position in which it will be protected from the weather and from being tampered with or accidentally injured.

The nature of my improvements will be best understood as described in connection with the drawings in which they are illustrated and in which:—

Figure 2:
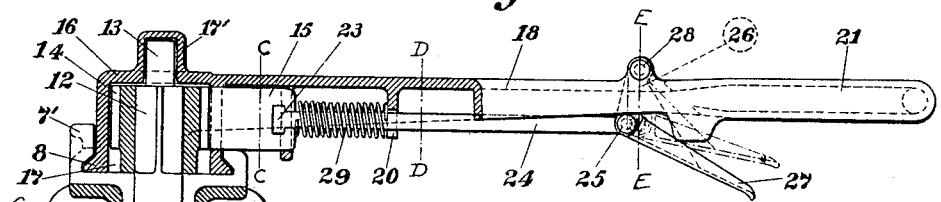
Figure 4:
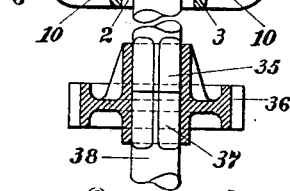
Figures 3, 5, 6:
Figures 7, 8:
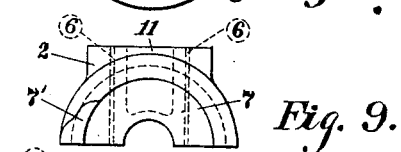
Figure 9:
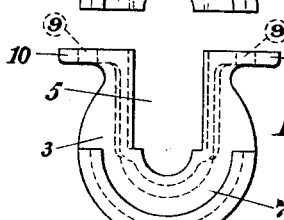
Figure 10:
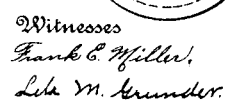
Figures 11, 12:
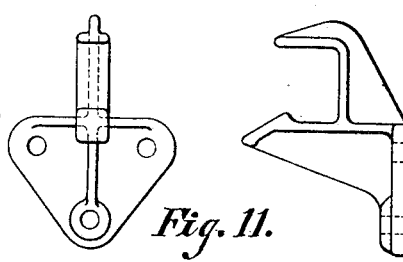
Figure 19:
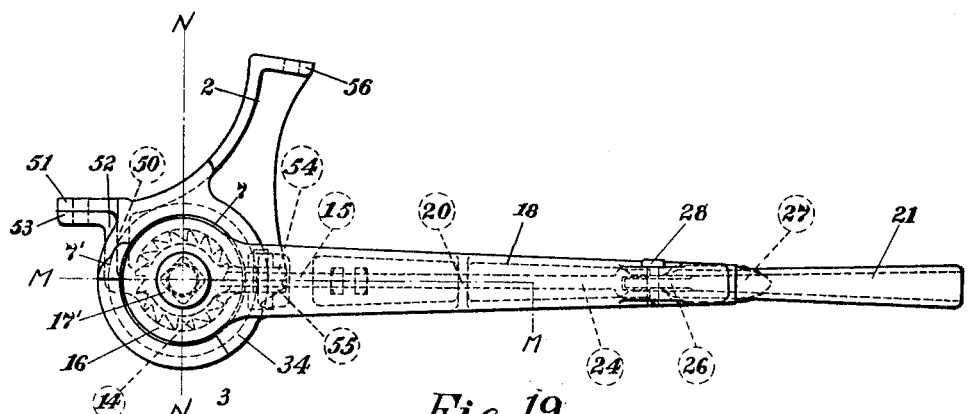
Figure 20:
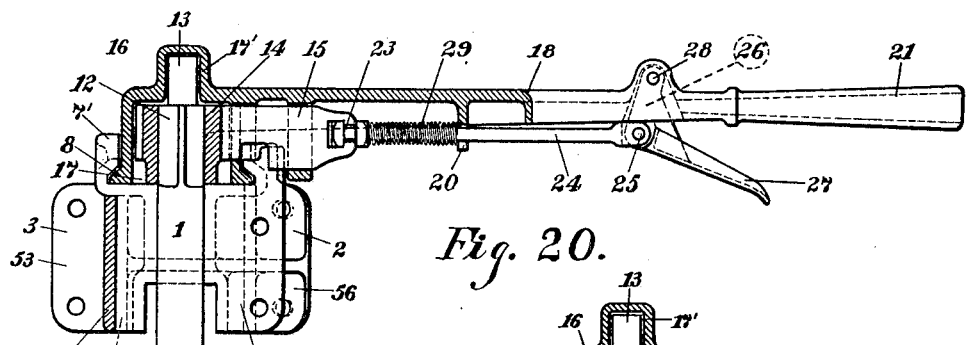
Figure 22:
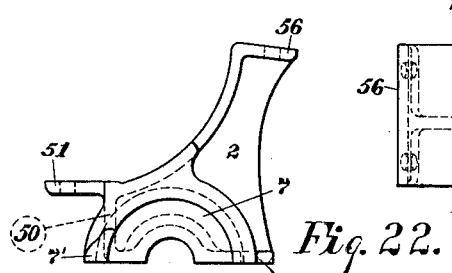
Figure 21:
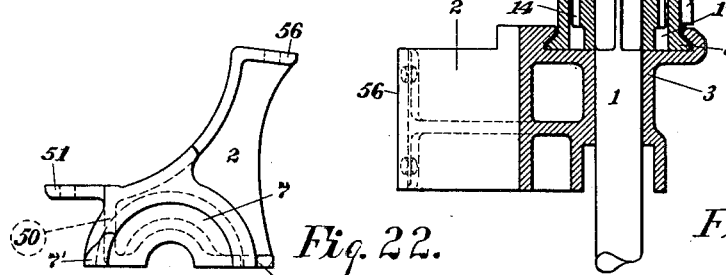
Figure 23:
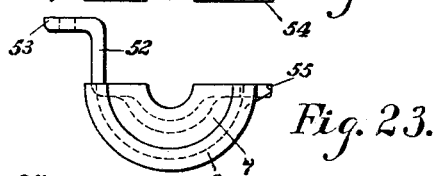
Figure 24:
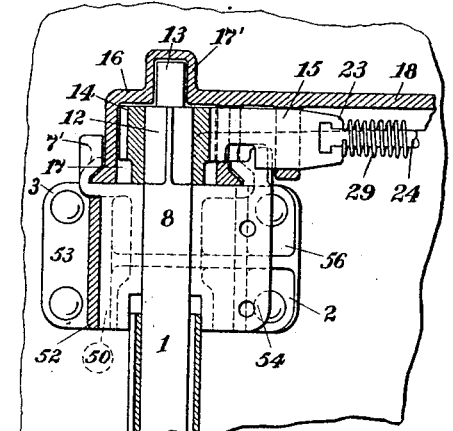

Figure 1 is plan view showing the bearing member in which the upper end of the brake mast is supported, and the mechanism and brake lever connected with the upper end of the brake mast; Fig. 2 is a longitudinal section on line A—A of Fig. 1, of the bearing member, brake lever mechanism and left-hand end of the brake lever, the right-hand end of the brake lever being shown in elevation. Fig. 3 is a section on line B—B of Fig. 1; Fig. 4 is a section on line C—C of Fig. 2; Fig. 5 is a section on line D—D of Fig. 2; Fig. 6 is a section on line E—E of Fig. 2, and Fig. 7 is a section on line G—G of Fig. 2. Fig. 8 is a plan view of the two-piece bearing member, both portions being shown in normal position, and Figs. 9 and 10 are similar plan views of said bearing member, the two portions being shown separated. Figs. 11 and 12, show front and side elevations respectively of the pawl retracting bracket, the purpose of which has been fully explained in my United States Patent, No. 574,549, above referred to. Figs. 13 to 16 inclusive show a modification of my invention consisting in a change in construction of some of the parts so as to provide a space for the location of a concealed spring, for the purpose of automatically returning the brake lever to its inoperative or locked position; of these Fig. 13 is a plan view; Fig. 14 a longitudinal section on line H—H of Fig. 13, the right hand end being shown in elevation; Fig. 15 a section on line K—K of Fig. 14 and Fig. 16 a section on line L—L of Fig. 13; Figs. 17 and 18 are plan views of the bearing members similar to Figs. 9 and 10, but modified to suit constructions shown in Figs. 13 to 16 inclusive. Figs. 19 to 23 inclusive show parts of my invention as applied to the form of brake lever more generally applied to passenger car service, a space for the automatically acting returning spring not being shown, but it must be understood that such a space can readily be provided, if desired. Fig. 19 is a plan view; Fig. 20 a longitudinal section on line M—M of Fig. 19, the right-hand end of the brake lever being shown in elevation; Fig. 21 a section on line N—N of Fig. 19, and Figs. 22 and 23 plan views of the two bearing members separated from each other. Fig. 24 is a part longitudinal section of my invention similar to that shown in the left hand portion of Fig. 20, but to which has been added the lower portion of the brake mast, brake mast casing, ratchet wheel and pawl, brake mast extension and spiral worm upon which the brake chain is wound, for the purpose of showing the connection between the upper and lower parts of the brake mast by means of the ratchet wheel having a square hole into which the squared ends of the two parts of the mast fits and which provides a strong connection without bolts or keys and facilitates repairs.

Figure 25:
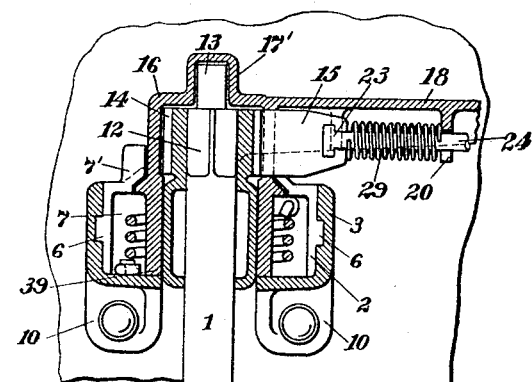
Figure 26:
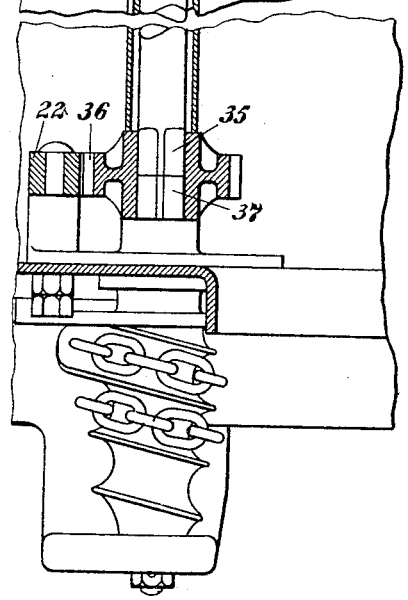
Figure 26:
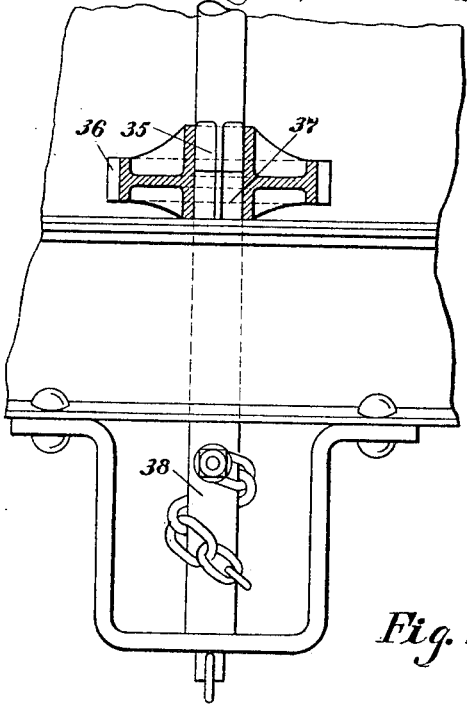
Figure 26:
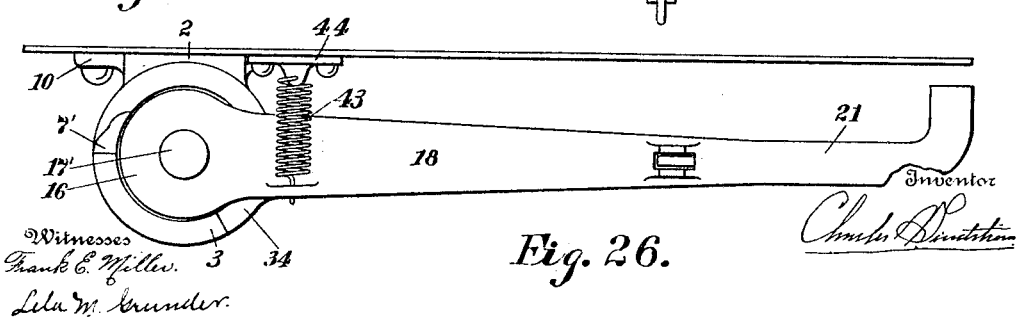
Figure 27:
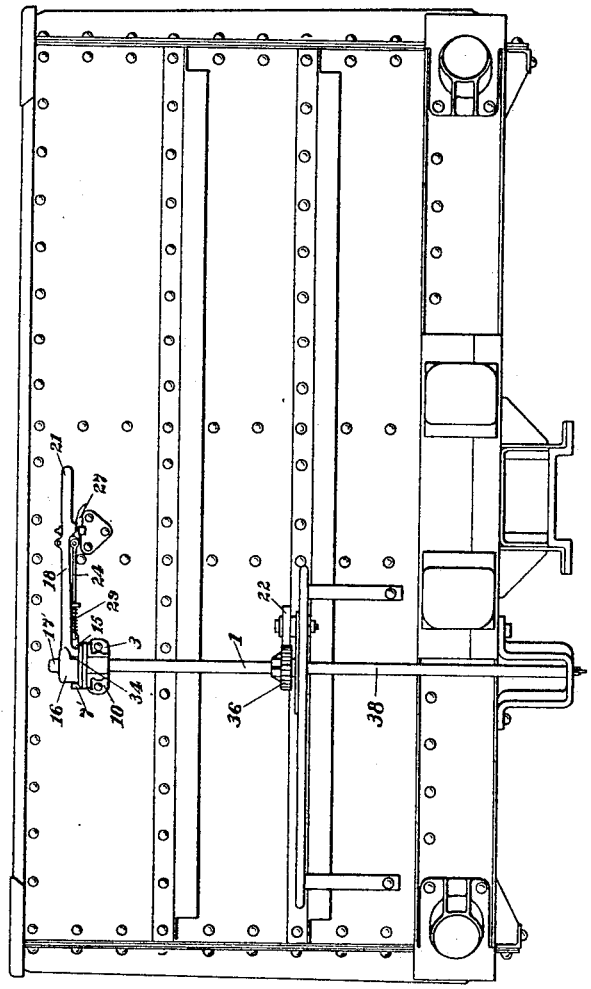

Fig. 25 is a part longitudinal section of my invention similar to that shown in the left hand portion of Fig. 14, except that the space for the concealed spring and the spring itself are modified, but to which has been added the lower end of brake mast ratchet wheel, brake mast extension, brake stirrup, and shows the brake chain wound directly on the mast. This arrangement is more generally used on freight cars but is also applicable to passenger cars. Fig. 26 is a plan view of my brake lever showing the application of an externally located spring for automatically returning the lever to its inoperative or locked position, but this or similar methods are not preferred. Fig. 27 shows the application of my invention to the end of a gondola freight car. Fig. 28 shows a plan view partly in section and Fig. 29 a sectional elevation of a modification of the method of applying a spring for automatically returning the lever to its inoperative position.

Referring to Figs. 1 to 12 of the drawings, 1 is a rotatable brake mast such as is commonly used in a railroad or street car. It is provided with a bearing member shown in Fig. 8, near its upper end, said bearing member being preferably formed of two pieces, 2 and 3. The lower portion 4 of the bearing piece 2 is so formed that it fits more or less loosely into a corresponding recess 5 in bearing piece 3, and is provided with projecting portions 6 which fit into corresponding recesses in piece 3, thus preventing any appreciable movement of piece 2 relative to piece 3. The upper portion of bearing piece 2 is so formed as to overlap the upper portion of bearing piece 3, said overlap extending to a point corresponding with the center line of the brake mast. The uppermost portions of the parts 2 and 3 are in form of an annular recess 7, half of the recess being formed on each piece, Figs. 9 and 10, and forming when fitted together the complete annular recess as shown in Fig. 8. This annular recess is formed with flat and angular surface as shown in Fig. 2, but may be made of any suitable shape, and adapted to retain, in a freely rotatable position, the portion 8 of the end of the brake lever. Piece 2 is also provided with a stop lug as indicated at 7', the purpose of which will be hereinafter explained. The two pieces 2 and 3 of the bearing member, Fig. 8 are held in normal position relative to each other by means which pass through holes 9, 9, in the flanges 10, 10 of the piece 3, and which serve to secure the complete bearing member against the end of the car, the end 11 of the piece 2, being in the same vertical plane as the outer face of the flanges, and also bearing against the end of the car. As shown, the upper end of the brake mast 1 is square as indicated at 12 and may be provided with a cylindrical end 13, of smaller diameter. 14 is a ratchet wheel placed on the squared portion 12 of the mast 1, and forming with the pawl 15 a clutch. 16 is a hub of the brake lever, the lower portion 8 being formed to fit the annular recess 7 formed in the bearing member, in such a manner as to admit of free rotation. The upper part of the hub 16, is chambered, as indicated at 17, so as to surround the ratchet wheel 14, and as indicated at 17' to surround the end 13 of the brake mast. 18 is a brake lever extending out from the hub 16, 19 being a slot formed through the walls of the chamber 17, in line with the lever 18. 20 is a lug depending from the under side of the lever 18 and 21 is the handle of the lever. 15 is a pawl having a beveled front edge as shown, said pawl extending through the slot 19 and being secured to the lever 18, so as to move angularly with said lever and at the same time free to take a longitudinal motion independent of the lever which will permit it to engage or disengage with the ratchet 14. In the construction shown the motion of the pawl 15 is in a straight line, the pawl being coupled by a joint 23 with the rod 24, which again is coupled by a pin 25 with the lever 26, 27, the end of which is pivoted at 28 to the lever 18, while the end 27 extends out in a direction approximately parallel to the lever 18, lying in such a position to the hand grip of the lever that they can both be readily grasped at the same time. A spring 29 is also provided through which rod 24 passes, the action of which is to thrust the pawl 15 into engagement with the ratchet wheel 14, one end of the spring resting against the pawl 15 and the other end against lug 20, substantially as described in one of my United States patents hereinbefore referred to viz: No. 574,549. The hub end of the brake lever is provided with a projecting stop-lug 34, which is adapted to contact with the stop-lug 7' on the bearing member, and so limit the extent of rotation of the hub 16 of the brake lever 18. The lower end 35 of the brake mast 1, is squared and inserted in a square hole in the ratchet wheel 36, and the end 37 of the extension brake mast 38 is also squared, and is inserted in the same hole in the ratchet wheel 36, the ends of the two shafts substantially meeting at a point about midway of the length of the hole in the ratchet wheel. From the foregoing description, it will be understood that no bolts, threaded parts, keys or pins are used to hold the brake lever on the brake mast, the ratchet to the mast, or the brake mast and the ratchet wheel together, the only securing means used being the bolts passing through the holes in the flanges of the bearing member which are for the purpose of securing this member to the car.

Referring now to Figs. 13 to 18 of the drawings which represent some modifications in the form of the details of my invention, and in which like reference characters indicate like parts in Figs. 1 to 12. The hub 16 of the brake lever is, in this modified form, extended downwardly at 39, and provided with a recess 40 into which the hooked end of a spiral spring 41, made of material of flat or other suitable section, is inserted and secured. The bearing members Figs. 17 and 18 are made sufficiently large and provided with a recess 7 to receive and contain one or more coils of the spring 41, the outer end of the spring being secured in any suitable manner to one of the portions of the bearing member. The object of the spring is to exert sufficient turning power on the hub of the brake lever, to cause the handle of the brake lever to be automatically returned against the end of the car and to remain there until moved away from it by the operator.

Figs. 28 and 29, show another method of applying a spring similar to that just described in which the spring is located entirely outside the bearing member 2, 3, and the brake lever, and in which the inner end of the spring is attached to the upwardly projecting portion 17' of the hub of the brake lever. The outer end of the spring is secured to a suitable upwardly projecting portion 48 formed on the bearing member 2, and the spring is protected from injury from any cause by a cup shaped protecting member 49, which may be secured to the hub of the brake lever by any convenient and suitable means. In this modification of my invention, I provide for the retracting of the pawl 15 and its disengagement from the ratchet wheel 14, means acting directly upon the pawl, such as is described in one of my United States patents hereinbefore referred to, viz:—No. 578,573.

In Figs. 19 to 23, I show a further modification of my invention which is especially applicable to passenger cars, and in which like reference characters indicate like parts in Figs. 1 to 12. The formation of the parts of the bearing member shown in Figs. 22 and 23, being such as would be easily applied and secured to the end construction of a passenger car with vestibuled platform. The method of securing together the two parts 2, 3, of the bearing member, and of securing them to the end of the car differs in detail from that shown in the aforementioned figures. The part 2 is provided with a straight portion 50 and flange 51, and part 3 with corresponding straight portion 52 and flange 53, which, when the two parts 2 and 3 are assembled, are brought together as shown in Fig. 19, and secured together by the same bolt, passing through flanges 51 and 53, as secures this side of the bearing member to the end of the car. At the other side of the bearing member, the parts 2 and 3 are furnished with flanges 54 and 55, which as shown in Fig. 19 are brought together and so secured by bolt or other suitable means. Part 2 is also furnished with another flange 56, for the purpose of forming an additional means for securing the bearing member to the end of the car. This flange may be of any desired shape, and occupy any desired position with regard to the bearing member 2, to suit the portion of the car end construction to which it is to be secured.

Referring now to Figs. 24 and 25 of the drawings, which show the parts assembled, and in which like reference characters indicate like parts in Figs. 1 to 12, and 13 to 16, it will readily be seen that in order to remove the brake lever it is necessary to remove the bolts which secure the whole mechanism to the car, which can not readily be done without proper tools, thus preventing thefts of levers which have been frequent when the levers are made of expensive material such as bronze; on the other hand, levers are very seldom removed for repairs or other causes, so that the increased difficulty of removal is only slight compared with the advantages gained, which advantages also include the removal of the two parts of the brake mast, ratchet and ratchet wheel, by the removal of the same bolts only.

Fig. 26 illustrates a further modification of a spring means which may be utilized for retaining the outer end of the brake lever in close proximity to the end of the car, and consists in a helical spring 43, one end of which is secured to a suitable projection or lug near to the hub end of the brake lever, the other end being secured to a bracket 44 or other suitable means attached to the end of the car as shown in the figure or to a suitable projection on the portion of the bearing member 2, and while as hereinbefore stated, externally located means for returning the lever to inoperative position are not preferred, yet when used they should be located as near the center of the hub as possible to obtain well known advantages in construction.

It will be readily observed that in all the modifications, the action and function of the parts described is substantially the same. The operator, taking hold of the hand-grip 21, moves the lever through a portion of an arc, turning the shaft 1, which is engaged and held against a backward motion by the pawl 22 and ratchet wheel 36, so that in place of setting the brakes by one continuous movement, the operator can work the lever 18 like the handle of a pump, and have at the same time the pawl 15 always under control of the same hand which grasps the hand-grip of the lever.

It is to be understood that I do not desire to limit the scope of my invention to the forms of construction herein shown, as it will be apparent to those skilled in the art, that many changes and modifications may be made, without departing from the spirit and scope of my invention, since

What I claim as new and desire to secure by Letters Patent is:—

1. The combination with a rotatable brake mast, of a brake actuating lever, a hub on said lever, said hub being irremovably connected to said brake mast by a non-rotatable bearing member adapted to interlock with said hub; substantially as described.

2. The combination with a rotatable brake mast, of a brake actuating lever irremovably connected to said brake mast by a non-rotatable two-piece bearing member adapted to interlock with said lever; substantially as described.

3. The combination with a rotatable brake mast, of a brake actuating lever, a hub on said lever, said hub being rotatably and irremovably connected to said brake mast by a non-rotatable bearing member adapted to interlock with said hub; substantially as described.

4. The combination with a rotatable brake mast of a brake actuating lever rotatably and irremovably connected to said brake mast by a non-rotatable two-piece bearing member adapted to interlock with said lever; substantially as described.

5. The combination with a rotatable brake mast, of a brake actuating lever, a hub on said lever, said hub being irremovably connected to end of said brake mast by a non-rotatable bearing member adapted to interlock with said hub; substantially as described.

6. The combination with a rotatable brake mast, of a brake actuating lever irremovably connected to one end of said brake mast by a non-rotatable two-piece bearing member adapted to interlock with said lever; substantially as described.

7. The combination with a rotatable brake mast, of a brake lever, a hub on said lever, said hub being rotatably and irremovably connected to one end of said brake mast by a non-rotatable bearing member adapted to interlock with said hub; substantially as described.

8. The combination with a rotatable brake mast, of a brake actuating lever rotatably and irremovably connected to one end of said brake mast by a non-rotatable two-piece bearing member adapted to interlock with said lever; substantially as described.

9. The combination with a rotatable brake mast, of a brake actuating lever, a hub on said lever, said hub being irremovably connected to said brake mast by a non-rotatable bearing member adapted to interlock with said hub, and means for operatively engaging said brake lever with said brake mast; substantially as described.

10. The combination with a rotatable brake mast, of a brake actuating lever, irremovably connected to said brake mast by a non-rotatable two-piece bearing member adapted to interlock with said lever; and means for operatively engaging said brake lever with said brake mast; substantially as described.

11. The combination with a rotatable brake mast, of a brake actuating lever, a hub on said lever, said hub being rotatably and irremovably connected to said brake mast by a non-rotatable bearing member adapted to interlock with said hub, and means for operatively engaging said brake lever with said brake mast; substantially as described.

12. The combination with a rotatable brake mast, of a brake actuating lever rotatably and irremovably connected to said brake mast by a non-rotatable two-piece bearing member adapted to interlock with said lever, and means for operatively engaging said brake lever with said brake mast; substantially as described.

13. The combination with a rotatable brake mast, of a brake actuating lever, a hub on said lever, said hub being irremovably connected to one end of said brake mast by a non-rotatable bearing member adapted to interlock with said hub, and means for operatively engaging said brake lever with said brake mast; substantially as described.

14. The combination with a rotatable brake mast, of a brake actuating lever irremovably connected to one end of said brake mast by a non-rotatable two-piece bearing member adapted to interlock with said lever, and means for operatively engaging said brake lever with said brake mast; substantially as described.

15. The combination with a rotatable brake mast, of a brake actuating lever, a hub on said lever, said hub being rotatably and irremovably connected to one end of said brake mast by a non-rotatable bearing member adapted to interlock with said hub, and means for operatively engaging said brake lever with said brake mast; substantially as described.

16. The combination with a rotatable brake mast, of a brake actuating lever rotatably and irremovably connected to one end of said brake mast by a non-rotatable two-piece bearing member adapted to interlock with said lever, and means for operatively engaging said brake lever with said brake mast; substantially as described.

17. The combination with a rotatable brake mast, of a brake actuating lever irremovably connected to said brake mast by a non-rotatable bearing member adapted to interlock with said lever, means for operatively engaging said brake lever with said brake mast, and means for automatically disengaging said brake lever from said brake mast, when the brake lever is moved to its normal position of rest; substantially as described.

18. The combination with a rotatable brake mast, of a brake actuating lever irremovably connected to said brake mast by a non-rotatable two-piece bearing member adapted to interlock with said lever, means for operatively engaging said brake lever with said brake mast, and means for automatically disengaging said brake lever from said brake mast, when the brake lever is moved to its normal position of rest; substantially as described.

19. The combination with a rotatable brake mast, of a brake actuating lever rotatably and irremovably connected to said brake mast by a non-rotatable bearing member adapted to interlock with said lever, means for operatively engaging said brake lever with said brake mast, and means for automatically disengaging said brake lever from said brake mast, when the brake lever is moved to its normal position of rest; substantially as described.

20. The combination with a rotatable brake mast, of a brake actuating lever rotatably and irremovably connected to said brake mast by a two-piece non-rotatable bearing member adapted to interlock with said lever, means for operatively engaging said brake lever with said brake mast, and means for automatically disengaging said brake lever from said brake mast when the brake lever is moved to its normal position of rest; substantially as described.

21. The combination with a rotatable brake mast, of a brake actuating lever rotatably and irremovably connected to said mast by a bearing member, means for engaging said brake lever with said brake mast and means for automatically returning said lever to its inoperative position; substantially as described.

22. The combination with a rotatable brake mast, of a brake actuating lever rotatably and irremovably connected to said brake mast by a bearing member, means for engaging said brake lever with said brake mast, and means for automatically returning mast, and tending to retain said brake lever in its inoperative position; substantially as described.

23. The combination with a rotatable brake mast, of a brake actuating lever rotatably and irremovably connected to said brake mast by a bearing member, means for engaging said brake lever with said brake mast, and means around the hub of the lever for automatically returning said brake lever to its inoperative position; substantially as described.

24. The combination with a rotatable brake mast, of a brake actuating lever rotatably and irremovably connected to said brake mast by a bearing member, means for engaging said brake lever with said brake mast, and means located within the bearing member for automatically returning said brake lever to its inoperative position; substantially as described.

25. The combination with a rotatable brake mast, of a brake actuating lever rotatably and irremovably connected to said mast by a bearing member, means for engaging said brake lever with said brake mast, and means for automatically returning said lever to a position of rest, and causing said brake lever to become disengaged from said brake mast; substantially as described.

26. The combination with a rotatable brake mast, of a brake actuating lever provided with means for engaging said brake mast, said lever having an extended hub, rotatably secured to said brake mast by a non-rotatable bearing member adapted to interlock with said hub; substantially as described.

27. The combination with a rotatable brake mast, of a brake actuating lever provided with means for engaging said brake mast, said lever having an extended hub, rotatably engaged by a non-rotatable two-piece bearing member adapted to interlock with said hub; substantially as described.

28. The combination with a rotatable brake mast, of a brake actuating lever rotatably and irremovably connected to said brake mast by means of a two-piece bearing member adapted to interlock with said lever, and without the use of securing means other than that used to secure said bearing member to a car; substantially as described.

29. The combination with a rotatable brake mast, of a brake actuating lever rotatably and irremovably connected to said brake mast by means of a non-rotatable two-piece bearing member adapted to interlock with said lever, said bearing member being provided with flanges for securing it to the end of a car; substantially as described.

30. The combination with a rotatable brake mast of a brake actuating lever rotatably and irremovably connected to said brake mast by means of a two-piece bearing member provided with flanges for attachment to the end of a car, the bolts passing through said flanges being the only securing means employed for retaining said bearing member and said brake lever in operable relation to each other; substantially as described.

31. The combination with a rotatable brake mast, of a brake actuating lever irremovably connected to said brake mast by means of a two-piece bearing member, one portion of said bearing member having a portion recessed within the other bearing member, and over lapping a portion of the other bearing member; substantially as described.

32. The combination with a rotatable brake mast, of a brake actuating lever rotatably and irremovably connected to said brake mast by a non-rotatable bearing member adapted to interlock with said lever, a stop on the hub of said brake lever and on said bearing member, said stops being arranged to engage each other to limit the extent of rotation of said brake lever; substantially as described.

33. The combination with a rotatable brake mast of brake actuating mechanism having a ratchet and pawl adapted to hold the brake closed, of a non-rotatable bearing member at the upper part of said mast, said bearing having a stop lug, a clutch arranged to engage and turn the shaft in the direction to set the brakes and a lever rotatably and irremovably connected to said brake mast by the said bearing member which is adapted to interlock with said lever and arranged to actuate said clutch when moved in one direction and to move freely in the reverse direction, said lever having a stop lug adapted to engage the lug on the bearing member and so limit the motion of the lever; substantially as described.

34. The combination with a rotatable brake mast of brake actuating mechanism having a ratchet and pawl adapted to hold the brake closed, of a bearing piece for the upper part of said mast, said bearing piece having a stop plug, a clutch arranged to engage and turn the shaft in a direction to set the brakes, a brake actuating lever rotatably and irremovably connected to the brake mast by means of said bearing member and arranged to actuate said clutch when moved in one direction and to move freely in the reverse direction, said lever having a stop lug adapted to engage the lug on the bearing member and thus limit the motion of the lever, an automatic clutch releasing device whereby the clutch and mast are disengaged when the lever is in its normal position of rest and spring means for automatically returning and retaining said lever in its normal position of rest; substantially as described.

35. The combination with a rotatable brake mast of brake setting mechanism having a ratchet and pawl adapted to hold the brake closed, of a brake actuating lever rotatably and irremovably connected to the brake mast by means of a bearing member, a second ratchet and pawl forming a clutch for rotating the mast in a direction to set the brake and a pawl-retracting device arranged to act directly upon and withdraw the pawl from engagement with its ratchet as the lever and pawl are moved to their normal position of rest, and spring means to automatically move said lever and pawl to said normal position of rest; substantially as described.

36. The combination with a rotatable brake mast 1 of brake-setting mechanism having a ratchet 36 and pawl 22 to hold the brake when set, of a brake actuating lever pivoted on mast 1, and irremovably connected thereto by a two-piece bearing member 2, 3, a clutch secured to said lever and arranged to engage and turn the mast when the lever is moved in the direction to set the brake while permitting the lever to move freely in the opposite direction, and automatic clutch releasing and lever retaining devices, whereby the clutch and mast are disengaged and the lever returned to inoperative position of rest; substantially as described.

37. The combination with a rotatable brake mast 1 of brake-setting mechanism having a ratchet 36 and pawl 22 to hold the brake when set, of a brake actuating lever pivoted on mast 1, and irremovably connected thereto by a two piece bearing member 2, 3, a clutch secured to said lever and arranged to engage and turn the mast when the lever is moved in the direction to set the brake while permitting the lever to move freely in the opposite direction, automatic clutch releasing and lever returning devices whereby the clutch and mast are disengaged and the lever returned to its inoperative position of rest, and a stop to hold the lever in said inoperative position of rest; substantially as described.

38. The combination with a rotatable brake mast 1 of brake-setting mechanism having a ratchet 36 and pawl 22 adapted to hold the brake when set, a lever pivoted on shaft 1, a non-rotatable two-piece bearing member 2, 3, for the upper portion of mast 1, forming an irremovably, interlocking connecting means between said mast and lever, and having a stop lug 7′, a clutch actuated by said lever and arranged to engage and turn the mast in a direction to set the brakes, when moved in one direction, and to move freely in the reverse direction, said lever having a stop lug 34 adapted to engage stop lug 7′ on the bearing member and thus limit the motion of the lever; substantially as described.

39. The combination with a rotatable brake mast 1 of brake-setting mechanism having a ratchet 36 and pawl 22 adapted to hold the brake set, a brake actuating lever pivoted on mast 1, a two-piece bearing member irremovably connecting said lever to said mast, said bearing member having a stop lug 7′, a clutch arranged to engage and turn mast 1 in a direction to set the brakes and operated by said lever, said lever being arranged to actuate said clutch when moved in one direction and to move freely in the reverse direction, a stop lug 34 on said lever adapted to engage stop lug 7' and limit the motion of the lever, an automatic clutch releasing device whereby the clutch and mast are disengaged when the lever is in its normal position of rest, and means whereby the lever is automatically returned to such normal position of rest; substantially as described.

40. The combination with a rotatable brake mast 1 of brake setting mechanism having a ratchet 36 and pawl 22, adapted to hold the brake set, of a ratchet 14 and pawl 15 forming a clutch for rotating the mast in a direction to set the brake, a brake actuating lever pivoted to mast 1, and arranged to carry and operate the pawl 15, an automatic pawl retracting device arranged to withdraw the pawl from engagement with its ratchet as the lever and pawl move to their normal inoperative position, a two-piece bearing member adapted to irremovably connect said brake lever to said mast, and means for automatically returning said lever to its normal inoperative position; substantially as described.

41. The combination with a rotatable brake mast, of a brake actuating lever, a hub on said lever and a non-rotatable bearing member adapted to interlock with and secure said hub to said brake mast; substantially as described.

42. The combination with a rotatable brake mast, of a brake actuating lever, and a non-rotatable two piece bearing member adapted to interlock with and secure said brake lever to said brake mast; substantially as described.

43. The combination with a rotatable brake mast, of a brake actuating lever, and a non-rotatable bearing member composed of a plurality of parts adapted to interlock with and rotatably secure said brake lever to said brake mast; substantially as described.

44. The combination with a rotatable brake mast, of a brake actuating lever, a hub on said lever and a non-rotatable bearing member adapted to interlock with and rotatably secure said hub to said brake mast; substantially as described.

45. The combination with a rotatable brake mast, of a brake actuating lever, a hub on said lever and a bearing member adapted to interlock with said hub, said non-rotatable bearing member forming a securing means between said hub and said brake mast; substantially as described.

46. The combination with a rotatable brake mast, of a non-rotatable bearing member therefor, adapted to rotatably secure the brake mast to a portion of a car, and a brake lever, said bearing member being adapted to interlock with and rotatably secure said brake lever to said brake mast; substantially as described.

47. The combination with a rotatable brake mast, of a brake actuating lever, a hub on said lever and a non-rotatable bearing member adapted to interlock with and rotatably secure said hub to said brake mast; substantially as described.

48. The combination with a rotatable brake mast, of a non-rotatable bearing member for said brake mast, and a brake actuating lever, a hub on said lever, said bearing member being adapted to interlock with and to secure said hub to one end of said brake mast; substantially as described.

49. The combination with a rotatable brake mast, of a non-rotatable bearing member for said brake mast, and a brake actuating lever, a hub on said lever, said bearing member being adapted to interlock with and to rotatably secure said hub to one end of said brake mast; substantially as described.

50. The combination with a rotatable brake mast, of a brake actuating lever on said brake mast, a non-rotatable bearing member composed of a plurality of parts adapted to interlock with and secure said brake actuating lever to said brake mast, and means for operatively engaging said brake actuating lever with said brake mast; substantially as described.

51. The combination with a rotatable brake mast, of a brake actuating lever on said brake mast, a non-rotatable bearing member composed of a plurality of parts adapted to interlock with and rotatably secure said brake actuating lever to said brake mast, and means for operatively engaging said brake actuating lever with said brake mast; substantially as described.

52. The combination with a rotatable brake mast, of a brake actuating lever, a hub on said lever and a non-rotatable bearing member adapted to interlock with said hub, said hub being secured to said brake mast by said bearing member; substantially as described.

53. The combination with a rotatable brake mast, of a brake actuating lever, a hub on said lever and a non-rotatable bearing member adapted to interlock with said hub, said hub being rotatably secured to said brake mast by said bearing member; substantially as described.

54. The combination with a rotatable brake mast, of a brake actuating lever and a non-rotatable bearing member composed of a plurality of parts adapted to interlock with said lever, said brake actuating lever being secured to said brake mast by said bearing member; substantially as described.

55. In a car, a rotatable brake mast, a non-rotatable bearing member adapted to rotatably secure the brake mast to a portion of the car, and a brake actuating lever on said brake mast, said bearing member adapted to interlock with and secure said brake actuating lever to said brake mast; substantially as described.

56. In a car, a rotatable brake mast, a non-rotatable bearing member composed of a plurality of parts and adapted to rotatably secure the brake mast to a portion of the car, and a brake actuating lever on said brake mast, said bearing member being adapted to interlock with and secure said brake actuating lever to said brake mast.

57. The combination with a rotatable brake mast, of a brake actuating lever on said brake mast, a hub on said lever and a non-rotatable bearing member adapted to interlock with and irremovably connect said brake mast and said hub; substantially as described.

58. The combination with a rotatable brake mast, of a brake actuating lever on said brake mast, and a non-rotatable bearing member composed of a plurality of parts, adapted to interlock with and irremovably connect said brake mast and said brake actuating lever; substantially as described.

59. The combination with a rotatable brake mast, of a non-rotatable bearing member for said brake mast, and a brake actuating lever, a hub on said lever adapted to be interlocked and rotatably and irremovably secured to said brake mast by said bearing member; substantially as described.

60. The combination with a rotatable brake mast, of a non-rotatable bearing member, composed of a plurality of parts, for said brake mast, and a brake actuating lever adapted to be interlocked and rotatably and irremovably secured to said brake mast by said bearing member; substantially as described.

61. The combination with a rotatable brake mast of a brake actuating lever, connected to said brake mast, a bearing member for said brake lever, and spring means within said bearing member for returning said lever to its inoperative position; substantially as described.

62. The combination with a vertical rotatable brake mast of a hand operated, independently movable, brake actuating lever connected to said brake mast, a hub on said lever and spring means surrounding said hub for returning said lever to its inoperative position; substantially as described.

63. The combination with a vertical rotatable brake mast of a hand operated, independently movable, brake lever, a hub on said lever engaging said brake mast, and spring means surrounding said hub for returning said lever to its inoperative position; substantially as described.

64. The combination with a vertical rotatable brake mast of a hand operated, independently movable, brake actuating lever, a hub on said lever engaging said brake mast, and spring means connected to said hub for returning said lever to its inoperative position; substantially as described.

65. The combination with a manually operable brake lever, of a bearing member adapted to interlock with said brake lever; substantially as described.

66. The combination with a manually operable brake lever, of a bearing member composed of a plurality of parts, adapted to interlock with said brake lever; substantially as described.

67. The combination with a manually operable brake lever of a hub on said brake lever, and a bearing member adapted to interlock with said hub; substantially as described.

68. The combination with a manually operable brake lever of a hub on said brake lever, of a bearing member composed of a plurality of parts adapted to interlock with said hub; substantially as described.

69. The combination with a rotatable brake mast of a brake actuating lever, a hub on said lever, said hub being open at one side only, and a bearing member adapted to irremovably connect with said hub; substantially as described.

70. The combination with a rotatable brake mast of a brake actuating lever, a hub on said lever, said hub being open at one side only, and a bearing member adapted to interlock with said hub; substantially as described.

In testimony whereof I affix my signature in presence of two witnesses.

CHARLES A. LINDSTRÖM.

Witnesses:
FRANK E. MILLER,
LELA M. GRUNDER.

Copies of this patent may be obtained for five cents each, by addressing the "Commissioner of Patents, Washington, D. C."